(12) United States Patent
Chen et al.

(10) Patent No.: US 8,078,828 B1
(45) Date of Patent: *Dec. 13, 2011

(54) MEMORY MAPPED REGISTER FILE

(75) Inventors: Hong-Yi Chen, Fremont, CA (US); Henry Hin Kwong Fan, San Mateo, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,867

(22) Filed: Jan. 31, 2011

Related U.S. Application Data

(63) Continuation of application No. 12/287,782, filed on Oct. 13, 2008, now Pat. No. 7,882,332, which is a continuation of application No. 10/627,269, filed on Jul. 25, 2003, now Pat. No. 7,437,532.

(60) Provisional application No. 60/468,802, filed on May 7, 2003.

(51) Int. Cl.
G06F 9/34 (2006.01)

(52) U.S. Cl. ........ 711/220; 711/202; 712/208; 712/218; 712/229

(58) Field of Classification Search .................. None
See application file for complete search history.

(56) References Cited

U.S. PATENT DOCUMENTS

| | | | |
|---|---|---|---|
| 5,497,499 A | 3/1996 | Garg et al. | |
| 5,560,032 A | 9/1996 | Nguyen et al. | |
| 5,583,804 A | 12/1996 | Seal et al. | |
| 5,701,493 A | 12/1997 | Jaggar | |
| 5,737,624 A | 4/1998 | Garg et al. | |
| 5,740,461 A | 4/1998 | Jaggar | |
| 5,809,522 A | 9/1998 | Novak et al. | |
| 5,826,055 A | 10/1998 | Wang et al. | |
| 5,832,292 A | 11/1998 | Nguyen et al. | |
| 5,926,841 A | 7/1999 | Novak et al. | |
| 5,970,241 A | 10/1999 | Deao et al. | |
| 6,038,653 A | 3/2000 | Nguyen et al. | |
| 6,112,019 A | 8/2000 | Chamdani et al. | |
| 6,131,157 A | 10/2000 | Wang et al. | |
| 6,279,101 B1 | 8/2001 | Witt et al. | |
| 6,282,630 B1 | 8/2001 | Nguyen et al. | |
| 6,363,471 B1 | 3/2002 | Mieer et al. | |
| 6,412,064 B1 | 6/2002 | Wang et al. | |
| 6,766,505 B1 | 7/2004 | Rangan et al. | |
| 7,024,544 B2 | 4/2006 | Shelor | |
| 7,096,345 B1 | 8/2006 | Chen et al. | |
| 7,139,899 B2 | 11/2006 | Kerr et al. | |
| 7,200,738 B2 | 4/2007 | Crook et al. | |

OTHER PUBLICATIONS

Computer Architecture A Quantitative Approach, Second Edition, David A. Patterson and John L. Hennessy with a contribution by David Goldberg; 1996; 14 pages.
Superscalar Microprocessor Design; Miek Johnson, 1991; 3 pages.
Hennessy, John L. and David A. Patterson; Computer Architecture, A Quantitative Approach; Second Edition; Morgan Kaufmann: 1990; p. 97,127,195,242-244,247-249, 252, 257, and 279.

(Continued)

Primary Examiner — Hetul Patel

(57) ABSTRACT

A method and apparatus for operating a memory mapped register file. The method includes: receiving a source index input having a length of T−1 bits, the source index input identifying one of a plurality of unbanked registers; receiving a processor mode input to identify one of P processor modes, where P is greater than two; generating an encoded address having a length of T bits based on the source index input and the processor mode input; and identifying one of the plurality of unbanked registers associated with one of the P processor modes using the encoded address.

16 Claims, 8 Drawing Sheets

OTHER PUBLICATIONS

Johnson, Mike; Superscalar Microprocessor Design; Prentice Hall; 1991; p. 169.

USPTO Non-Final Office Action mailed Dec. 13, 2005 for U.S. Appl. No. 10/627,269, filed Jul. 25, 2003.

Amendment filed Mar. 9, 2006 in response to USPTO Non-Final Office Action mailed Dec. 13, 2005 for U.S. Appl. No. 10/627,269, filed Jul. 25, 2003.

USPTO Final Office Action mailed Mar. 27, 2006 for U.S. Appl. No. 10/627,269, filed Jul. 25, 2003.

Preliminary Amendment and Petition for Extension of Time filed Jul. 26, 2006 in response to USPTO Final Office Action mailed Mar. 27, 2006 for U.S. Appl. No. 10/627,269, filed Jul. 25, 2003.

USPTO Non-Final Office Action mailed Aug. 9, 2006 for U.S. Appl. No. 10/627,269, filed Jul. 25, 2003.

Amendment and Petition for Extension of Time filed Nov. 13, 2006 in response to USPTO Non-Final Office Action mailed Aug. 9, 2006 for U.S. Appl. No. 10/627,269, filed Jul. 25, 2003.

USPTO Final Office Action mailed Mar. 16, 2007 for Application No. 10/627,269 filed Jul. 25, 2003.

Amendment after Final filed May 16, 2007 in response to USPTO Final Office Action mailed Mar. 16, 2007 for U.S. Appl. No. 10/627,269, filed Jul. 25, 2003.

USPTO Non-Final Office Action mailed Jun. 13, 2007 for U.S. Appl. No. 10/627,269, filed Jul. 25, 2003.

Amendment and Petition for Extension of Time filed Oct. 3, 2007 in response to USPTO Non-Final Office Action mailed Jun. 13, 2007 for U.S. Appl. No. 10/627,269, filed Jul. 25, 2003.

USPTO Final Office Action mailed Nov. 1, 2007 for U.S. Appl. No. 10/627,269, filed Jul. 25, 2003.

Response after Final filed Jan. 4, 2008 in response to USPTO Non-Final Office Action mailed Nov. 1, 2007 for U.S. Appl. No. 10/627,269, filed Jul. 25, 2003.

MEMORY MAP 500

| Address | Processor Mode | Encoded Address |
|---|---|---|
| R0 (0000) | ALL | 00000 |
| R1 (0001) | ALL | 00001 |
| R2 (0010) | ALL | 00010 |
| R3 (0011) | ALL | 00011 |
| R4 (0100) | ALL | 00100 |
| R5 (0101) | ALL | 00101 |
| R6 (0110) | ALL | 00110 |
| R7 (0111) | ALL | 00111 |
| R8 (1000) | FIQ | 01000 |
| R9 (1001) | FIQ | 01001 |
| R10 (1010) | FIQ | 01010 |
| R11 (1011) | FIQ | 01011 |
| R12 (1100) | FIQ | 01100 |
| R13 (1101) | FIQ | 01101 |
| R14 (1110) | FIQ | 01110 |
| Reserved (1111) | ALL | 01111 |
| R14 (1110) | IRQ | 10000 |
| R13 (1100) | IRQ | 10001 |
| R14 (1110) | SVC | 10010 |
| R13 (1100) | SVC | 10011 |
| R14 (1110) | UND | 10100 |
| R13 (1100) | UND | 10101 |
| R14 (1110) | ABT | 10110 |
| R13 (1100) | ABT | 10111 |
| R8 (1000) | USR, UND, SVC, ABT, IRQ | 11000 |
| R9 (1001) | USR, UND, SVC, ABT, IRQ | 11001 |
| R10 (1010) | USR, UND, SVC, ABT, IRQ | 11010 |
| R11 (1011) | USR, UND, SVC, ABT, IRQ | 11011 |
| R12 (1100) | USR, UND, SVC, ABT, IRQ | 11100 |
| R13 (1101) | USR | 11101 |
| R14 (1110) | USR | 11110 |
| Reserved (1111) | ALL | 11111 |

FIG. 5

MEMORY MAPPED REGISTER FILE

CROSS REFERENCE TO RELATED APPLICATIONS

This application is a continuation of U.S. application Ser. No. 12/287,782 (now U.S. Pat. No. 7,882,332), filed Oct. 13, 2008, which is a continuation of U.S. application Ser. No. 10/627,269 (now U.S. Pat. No. 7,437,532), filed Jul. 25, 2003, which claims priority under 35 U.S.C. §119(e) to U.S. Provisional Application No. 60/468,802, filed May 7, 2003. This application is also related to commonly owned U.S. application Ser. No. 10/672,774 (now U.S. Pat. No. 7,096,345), filed Sep. 26, 2003. The disclosures of the applications referenced above are incorporated herein by reference.

FIELD

This invention relates generally to data processing systems and, more particularly, to a memory mapped register file for a data processing system.

BACKGROUND

General purpose registers or a "register file" are an essential component of a data processing system's processing architecture. For instance, a microprocessor or central processing unit (CPU) of a data processing system retrieves and stores data from and to one or more general purpose registers to process instructions. These registers allow the data processing system to perform instructions more efficiently. Many prior microprocessor architectures use sixteen general purpose registers designated, e.g., R0 through R15, and operate in different processor modes.

Prior microprocessor architectures that use such general purpose registers also process reduced instruction set computer (RISC) instructions and operate in six different processor modes: user (USR) mode, fast interrupt request (FIQ) mode, interrupt request (IRQ) mode, supervisor (SVC) mode, undefined instruction (UND) mode, and abort exception (ABT) mode. The user mode is typically used for executing user applications. The other modes are "exception handling" modes and halt a user application in the user mode, e.g., responding to an interrupt request. For the exception handling modes, physical access to some of the general purpose registers is performed through multiple memory units of "banked" registers that are mapped to the same general purpose registers, to improve exception handling processing. That is, depending on the exception handling mode, separate and distinct registers are accessed. "Unbanked" general purpose registers do not map to banked registers and are accessed directly in all processor modes.

FIG. 1 illustrates "unbanked" and "banked" general purpose registers for this prior architecture. As shown, general purpose registers 100 includes sixteen registers R0 through R14 and one register that stores a program counter (PC). General purpose registers 100 are divided into unbanked registers 112 and banked registers 111. Unbanked registers 112 correspond to registers R0 through R7 and banked registers 111 correspond to registers R8 through R14. Banked registers 111 map to FIQ banked registers 102, IRQ banked registers 104, SVC banked registers 106, UND banked registers 108, and ABT banked registers 110 for their respective exception handling processor modes. For this prior architecture, general purpose registers R8 through R14 are mapped to multiple memory units, i.e., five separate and distinct banked registers, for different exception handling modes.

For instance, during the interrupt request, supervisor, undefined instruction, or abort exception handling modes, access to general purpose registers R13 through R14 is performed using IRQ, SVC, UND, and ABT banked registers 104, 106, 108, and 110, respectively, instead of registers R13 or R14 of general purpose registers 100. Similarly, during fast interrupt request exception handling mode, access to general purpose registers R8 through R14 is performed using FIQ banked registers 102, instead of registers R8 through R14 of general purpose registers 100. Using these banked registers avoids physical access to the preserved data in general purpose registers 100 corresponding to the respective exception handling modes.

In this manner, for the exception handling modes, physical access to some general purpose registers 100, i.e., R8 through R14 or R13 through R14, is performed using multiple memory units of respective banked registers to improve exception handling. A disadvantage, however, of using banked registers is that it requires a special type of naming scheme to distinguish between the different types of banked registers for the different types of exception handling modes, which increases processing overhead. Furthermore, such a general purpose register or "register file" scheme inefficiently accesses general purpose registers by requiring access to multiple memory units of banked registers for different exception handling modes. In other words, the prior register file requires memory access to five separate and distinct memory units for the five different exception handling modes.

There exists, therefore, a need for an improved scheme for general purpose registers or register files without using multiple banked registers for different processor modes.

SUMMARY

In general, in one aspect, this specification describes a method and apparatus for operating a memory mapped register file. The method includes: receiving a source index input having a length of T−1 bits, the source index input identifying one of a plurality of unbanked registers; receiving a processor mode input to identify one of P processor modes, where P is greater than two; generating an encoded address having a length of T bits based on the source index input and the processor mode input; and identifying one of the plurality of unbanked registers associated with one of the P processor modes using the encoded address.

DESCRIPTION OF THE DRAWINGS

The accompanying drawings, which are incorporated in and constitute a part of the specification, illustrate exemplary implementations and embodiments of the invention and, together with the detailed description, serve to explain the principles of the invention. In the drawings.

FIG. 5 illustrates a diagram of one example of a memory map of general purpose register indexes of FIG. 4 to encoded addresses for the memory mapped register file of FIG. 3;

DETAILED DESCRIPTION

Reference will now be made in detail to exemplary implementations and embodiments of the invention, examples of which are illustrated in the accompanying drawings. Wherever possible, the same reference numbers will be used throughout the drawings to refer to the same or like parts.

A memory mapped register file is disclosed that overcomes disadvantages of prior register files and provides a more efficient and simple way of accessing general purpose registers for a data processing system that can operate in multiple processor modes.

According to one example, a register file for a data processing system comprises a memory unit, input ports, and output ports. The memory unit includes a plurality of registers addressable by an encoded address, wherein the encoded address corresponds to a respective one of the plurality of registers and a corresponding processor mode. The input ports receive inputs for addressing at least one register using an encoded address. The output ports output data from at least one register addressable by an encoded address.

In this manner, the memory unit can be used to access registers (e.g., general purpose registers) of a register file for different processor modes as opposed to using multiple memory units of "banked registers". This allows for efficient access to registers, which are accessible in the memory unit. Moreover, processing overhead is improved because each register is addressable by an encoded address without requiring a special naming scheme, as required for a register file that uses multiple memory units of banked registers. Thus, in the following description, reference to a "memory mapped register file" is a register file having a memory unit with a plurality of registers addressable by encoded addresses. Additionally, the register file described herein can be implemented for various types of microprocessor architectures that require access to registers in different processor modes.

Figure 1:
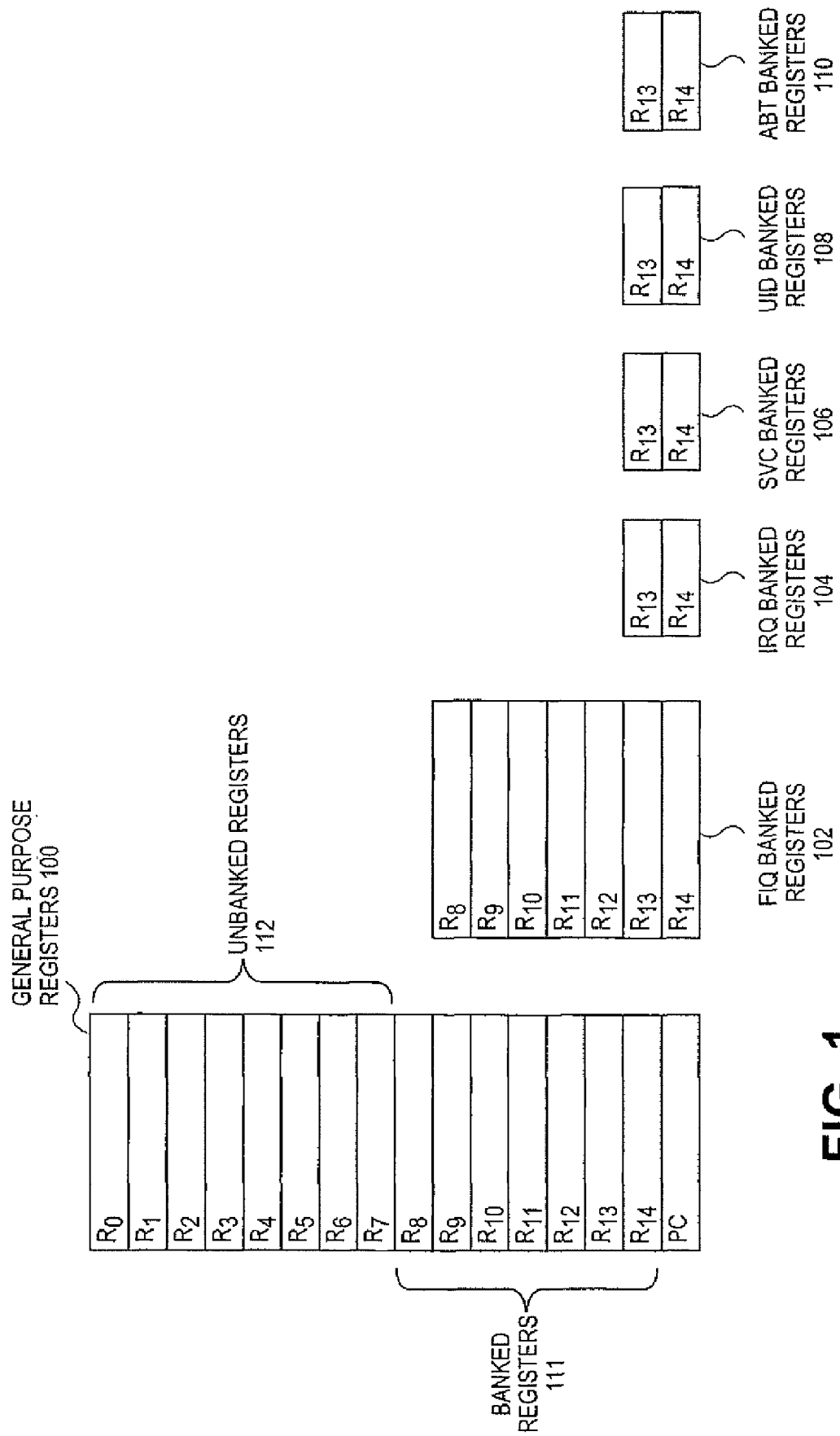
FIG. 1 illustrates banked and unbanked general purpose registers for a prior art microprocessor architecture.
Figure 2:
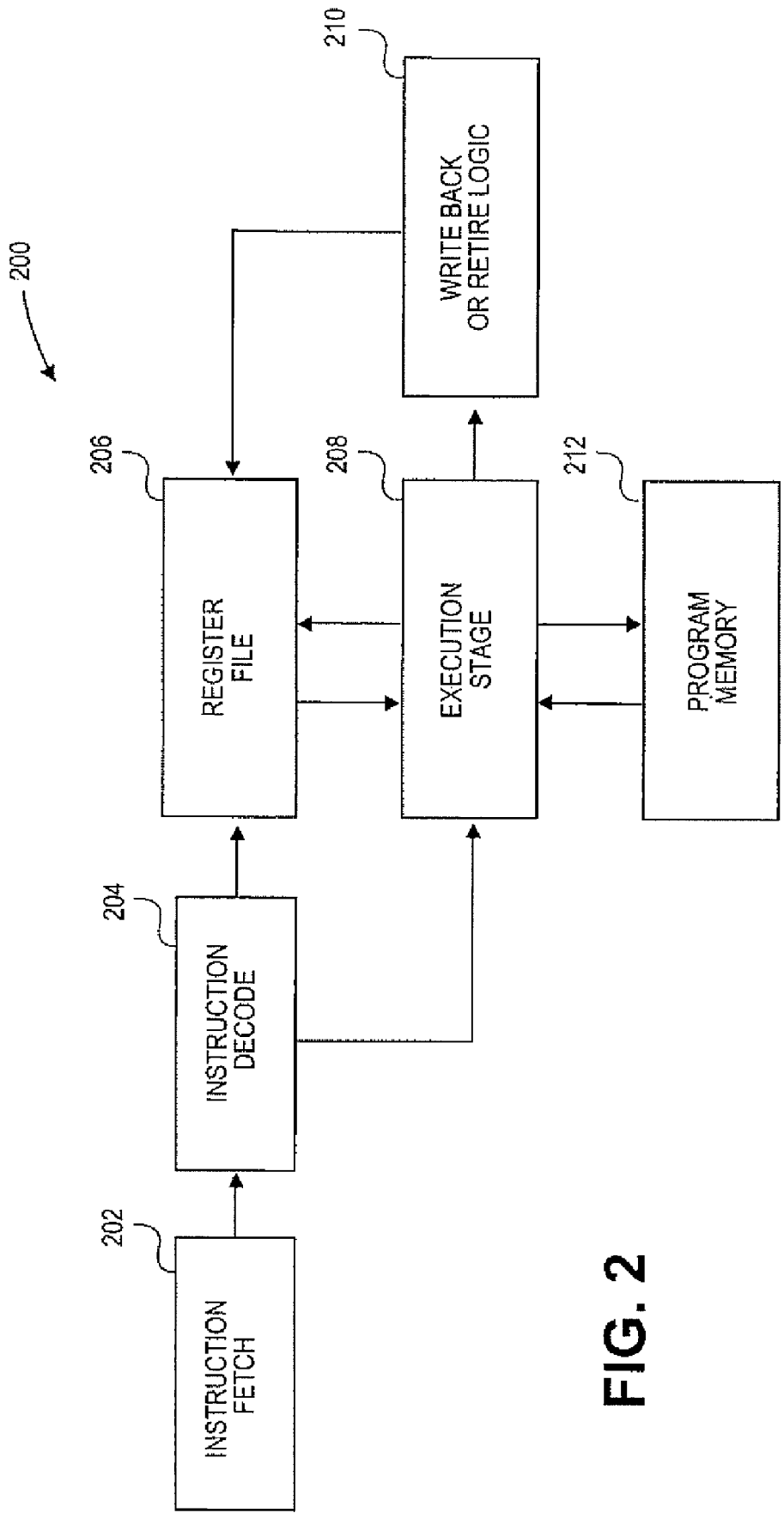
FIG. 2 illustrates one example of a data processing system having a pipeline microprocessor architecture with a memory mapped register file.

FIG. 2 illustrates one example of a data processing system 200 having a pipeline microprocessor architecture with a memory mapped register file 206. The pipeline can be a RISC pipeline that processes RISC instructions in multiple stages. The techniques described herein, however, can be used for other types of microprocessor instructions. Data processing system 200 includes a pipeline comprising an instruction fetch stage 202, an instruction decode stage 204, a register file 206, an execution stage 208, and a write back or retire logic stage 210. Data processing system 200 also includes a program memory 212 that, stores instructions for execution by execution stage 208. In this example, the pipeline stages and memory can be implemented as an integrated circuit (IC) using any combination of circuits, components, memory devices, and bus lines.

Figure 3:
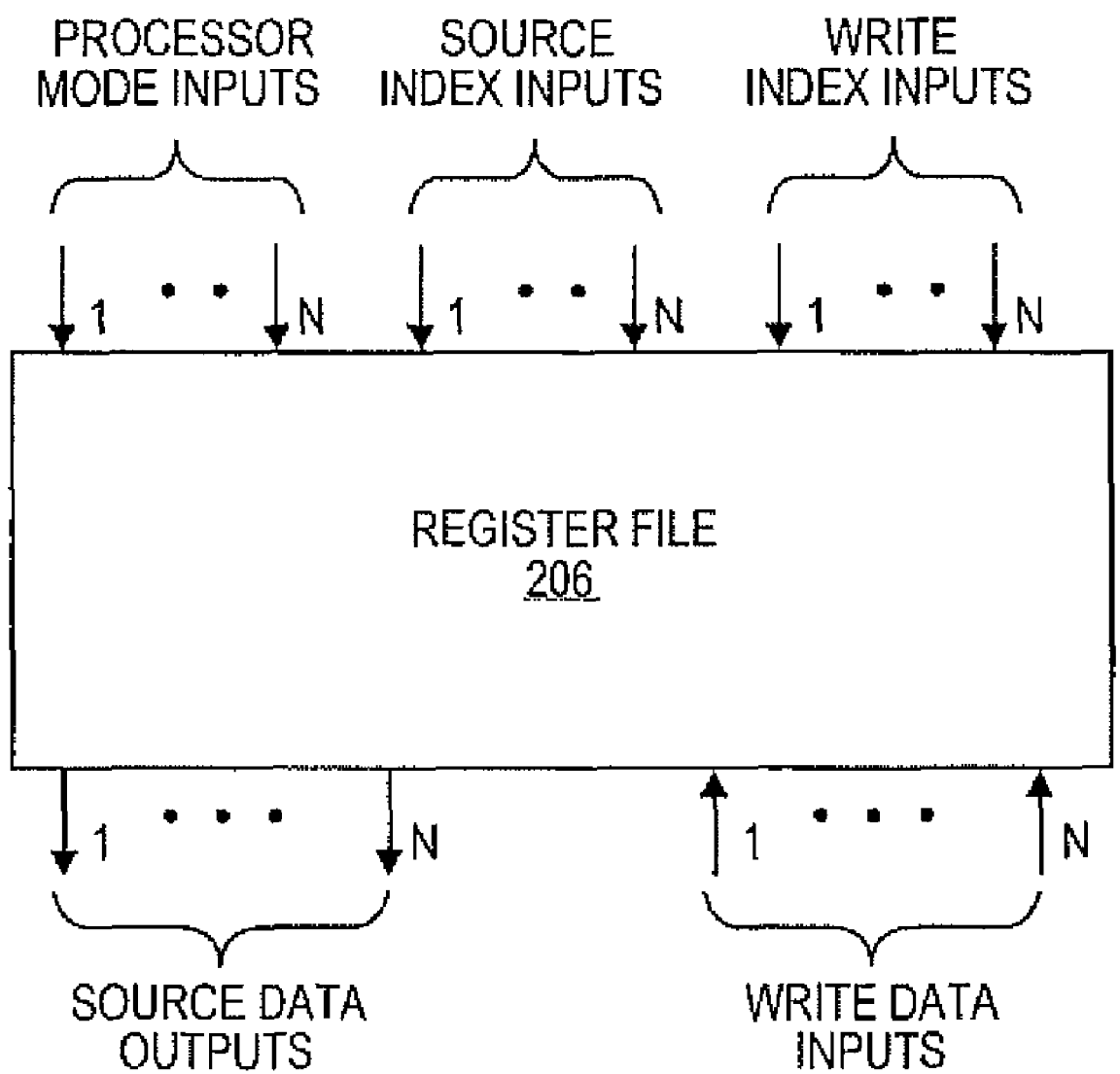
FIG. 3 illustrates in block diagram form one example of inputs and outputs for the memory mapped register file of FIG. 2.

Instruction fetch 202 fetches the current instruction from memory (e.g., program memory 212) and forwards the instruction to instruction decode stage 204. Stage 204 decodes the instruction and sends inputs to memory mapped register file 206 to access appropriate registers (e.g., general purpose registers) in order for execution stage 208 to process the instruction. FIG. 3 illustrates in block diagram form one example of inputs and output for memory mapped register file 206. Thus, referring also to FIG. 3, for example, instruction decode stage 204 sends "processor mode inputs" and, "source index inputs" to memory mapped register file 206. Memory mapped register file 206 uses the inputs from instruction decode stage 204 to obtain an encoded address for accessing the desired register within memory mapped register file 206 in order to execute the instruction. Thus, data from the accessed register using the encoded address is forwarded to execution stage 208.

Moreover, the "processor mode inputs" and "write index inputs" can be sent to memory mapped register file 206 by other components or control circuitry (not shown) to write data into a desired general purpose register within memory mapped file register 206. For example, data received at "write data inputs" can be written into memory mapped file register 206 at an encoded address derived from the "processor mode inputs" and "write index inputs". This allows write back or retire logic 210 to send data for storage in memory mapped register file 206 via the "write index inputs". The manner in which these inputs are used by memory mapped register file 206 is described in further detail below with regards to FIGS. 3 through 6.

Execution stage 208 can include any number of instruction execution units. Examples of execution units include arithmetic logic units (ALUs), load/store units, multiply and accumulate units (MACS), etc. Execution stage 208 also operates with program memory 212 to execute instructions. For example, for a load/store operation, execution stage 208 can store data into program memory 212 after processing an instruction using a load/store execution unit. In one example, instructions are issued to execution stage 208 in-order, but can be executed out-of order in a manner disclosed in the above-noted, commonly owned U.S. patent application Ser. No. 10/672,774 (now U.S. Pat. No. 7,096,345).

Thus, in this example, execution stage 208 can forward data from executed instructions ("results data") to write back or retire logic 210 ("logic 210"). Logic 210 can forward results data back to memory mapped register file 206. For example, logic 210 can write back results of executed instructions from execution stage 208 to memory mapped register file 206. Additionally, for execution stage 208 that can execute instructions out-of-order using a re-order buffer with "retire logic", as disclosed in the above-noted patent application, logic 210 can retire instructions and send data to memory mapped register file 206. As further explained below, memory mapped register file 206 includes a plurality of ports to receive write data from logic 210. Accordingly, logic 210 can retire one or more results for instructions at a time that are stored in one or more registers in memory mapped register file 206.

With further reference to FIG. 3, memory mapped register file 206 is scalable to receive any number of inputs and output any number of outputs. Thus, in the example shown in FIG. 3, memory mapped register file 206 includes four sets of input ports to receive processor mode inputs, source index inputs, write index inputs, and write data inputs. Each set of input ports receives a plurality of inputs (input 1 through input N). Memory mapped register file 206 also includes a set of output ports to output source data outputs having output 1 through output N. In this example, memory mapped register file 206 can receive inputs and provide outputs for a multiple issue data processing system. Specifically, memory mapped register file 206 is capable of outputting and multiple instructions at the same time.

For example, if two instructions require two ALU operations and each operation requires two source data inputs from memory mapped register file 206, memory mapped register file 206 can receive four processor mode inputs and four source index inputs to access and output data from four registers as source data outputs. This capability assumes there are no data dependencies, e.g., the second ALU operation does not require the result of the first ALU operation as an input. In particular, if the first ALU operation is A+B and the second ALU operation is C+D and the operand data for A through D is stored in four different registers of memory mapped register file 206, N=4 for the number of inputs and outputs for memory mapped register file 206. Accordingly, memory mapped register file 206 uses processor mode inputs 1 through 4 and source index inputs 1 through 4 to obtain encoded addresses for accessing the four registers holding the operand data A through D in memory mapped register file 206 in order to output the operand data as source outputs 1 through 4.

Similarly, if two instructions can be retired from retire logic 210, memory mapped register file 206 can store data from the two retired instructions at a time through write data input 1 and write data input 2. For example, memory mapped register file 206 uses processor mode input 1 and write index input 1 to obtain an encoded address for the register storage location within memory mapped register file 206 for data received at write data input 1. In addition, memory mapped register file 206 uses processor mode input 2 and write index input 2 to obtain an encoded address for the register storage location within memory mapped register file 106 for data received at write data input 2. The manner of processing the above inputs and outputs is explained in further detail below.

Figure 4:
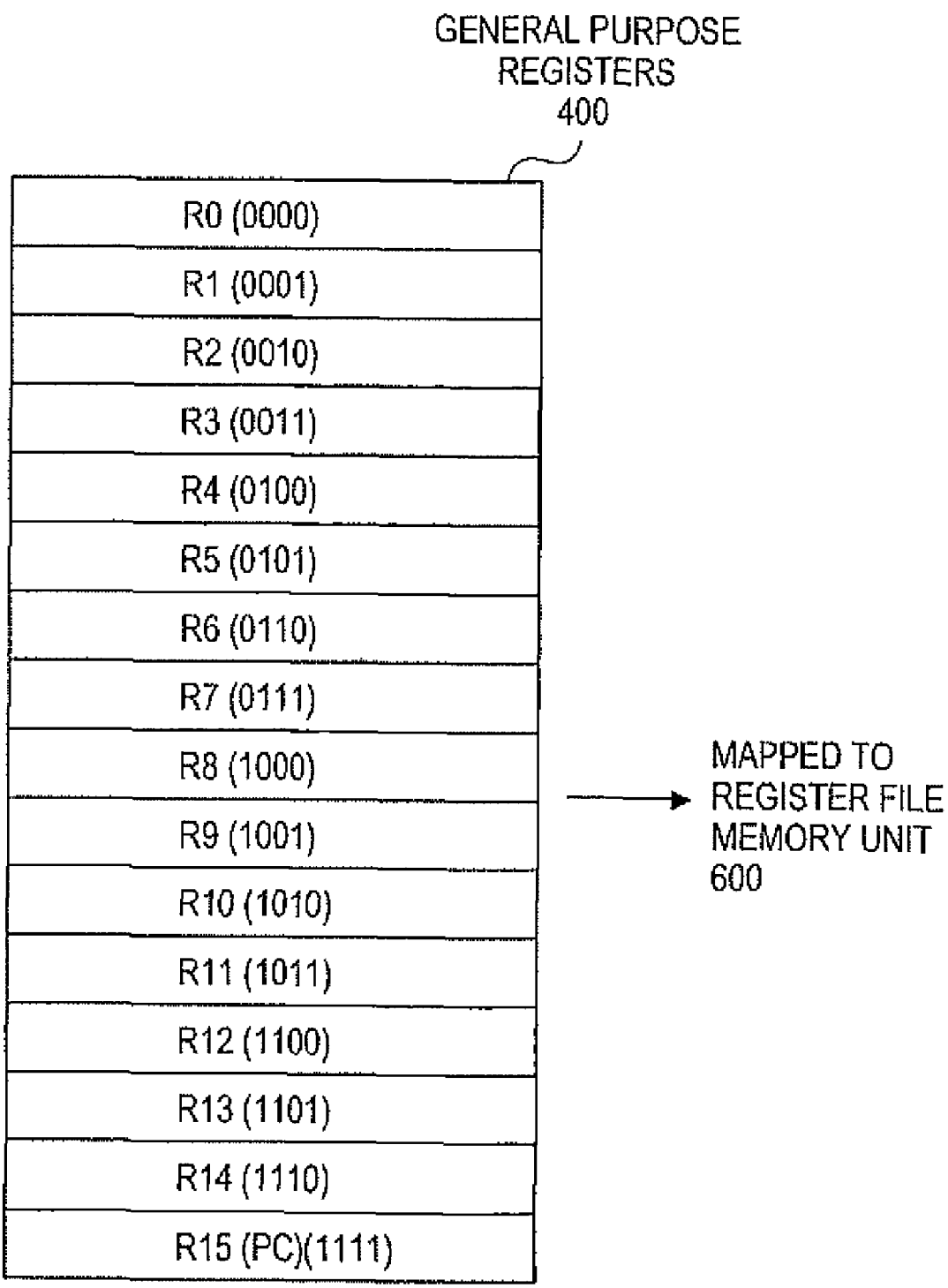
FIG. 4 illustrates a block diagram of one example of general purpose registers for the memory mapped register file 206 of FIG. 3.

FIG. 4 illustrates a block diagram of one example of general purpose registers 400 for memory mapped register file 206. General purpose registers 400 includes sixteen general purpose registers R0 through R15. These registers are associated with register indices ranging from 0000 to 1111 for the sixteen registers. These indices can be used to access the physical general purpose registers 400.

For memory mapped register file 206, the sixteen register indices (0000 through 1111) map to thirty-two encoded addresses (00000 through 11111) for addressing thirty-two registers in memory mapped register file 206. FIG. 5 illustrates a diagram of one example of a memory map 500 of the sixteen general purpose register indices of FIG. 4 to encoded addresses corresponding to thirty-two registers in memory mapped register file 206.

Memory map 500 thus contains thirty-two registers having encoded addresses that map to register indices of general purpose registers 400 in various processor modes. As shown in FIG. 5, each encoded address maps to an index 0000 to 1111 of one of the general purpose registers based on at least one processor mode. In this way, a single memory unit can be used to access storage locations of general purpose registers for different processor modes using the encoded addresses.

This map can be used by encoders to determine encoded addresses using g register index inputs and processor mode inputs for accessing thirty-two registers memory mapped register file 206 associated with general purpose registers. This example, shown in FIG. 5, is based on data processing system 200 being a RISC type system that operates in six different types of processor modes: user mode (USR) mode, fast interrupt request (FIQ) mode, interrupt request (IRQ) mode, supervisor (SVC) mode, undefined instruction (UND) mode, and abort exception (ABT) mode. General purpose registers 400 provides data processing system 200 with sixteen general purpose registers.

As illustrated in memory map 500, registers R0 through R7 having register indices ranging from 0000 to 0111 map to 5-bit encoded addresses ranging from 00000 to 00111. These registers can share the same physical storage location and occupy the first eight storage locations in memory. For example, general purpose register R1 can be addressable using the encoded address 00001.

For general purpose registers R8 through R12, all processor modes except for the FIQ mode share the same memory locations in register file memory unit 600, which are at storage locations addressable by encoded addresses ranging from 11000 through 11111. In the FIQ mode, general purpose registers R8 through R14 are located at storage locations addressable by the encoded addresses 01000 through 01110. Register R15 that is indicated by "Reserved" shares the same memory location for all modes. In this example, R15 can store a program counter (PC). Each of the IRQ, SVC, UND, and ABT modes can access different memory locations to access general purpose registers R13 and R14. Memory map 500 thus details mapping of register indices to their corresponding physical value in memory.

Thus, unlike prior art register files, memory mapped register file 206 uses a single memory unit to access general purpose registers for different processor modes by mapping general purpose register indices to encoded addresses. As a result, general purpose registers used for processor modes such as FIQ, IRQ, SVC, UND, and ABT can be accessed using a single memory unit without using multiple "banked" registers.

Figure 6:
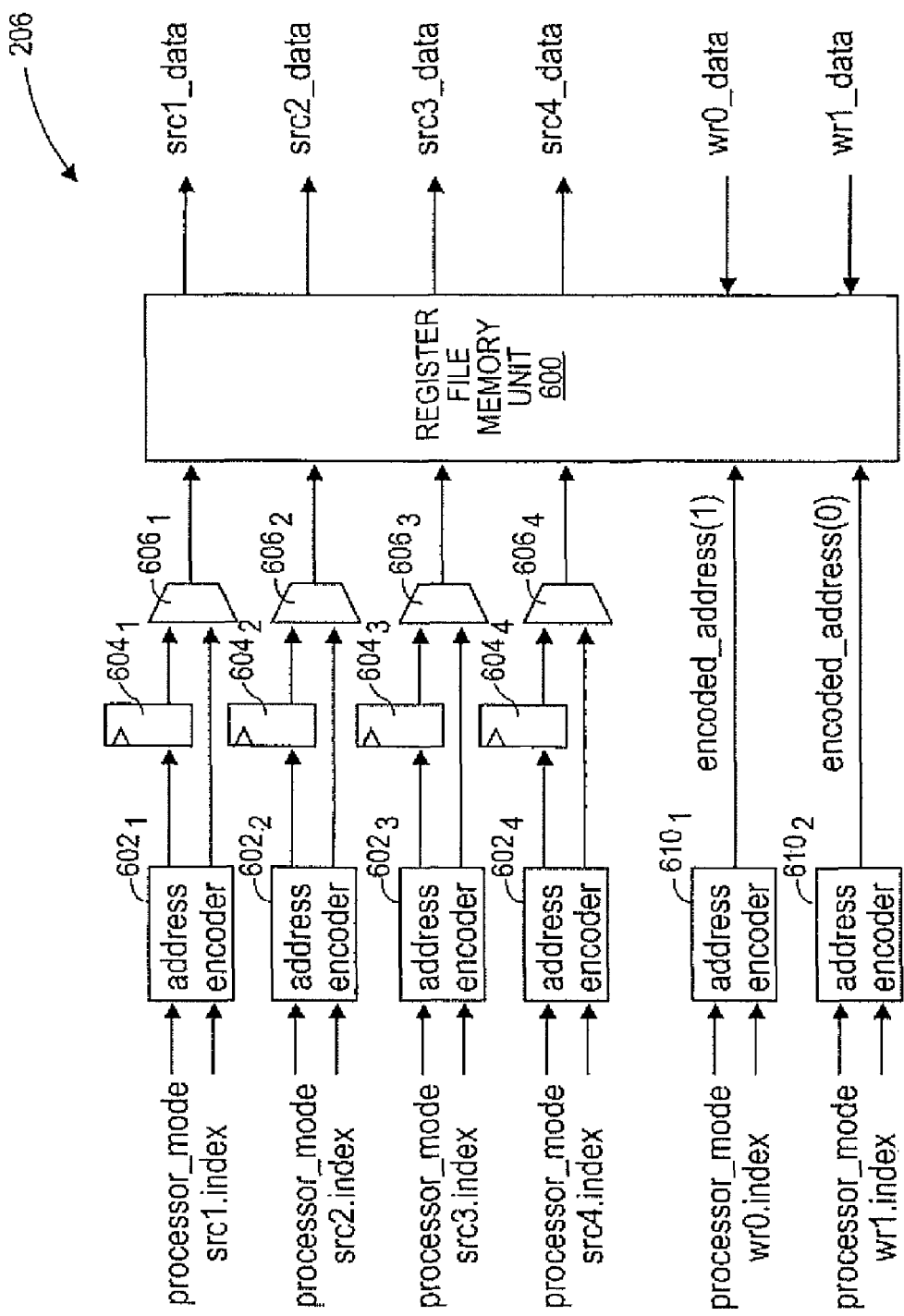
FIG. 6 illustrates a detailed circuit diagram of one example of the memory mapped register file of FIG. 3.

FIG. 6 illustrates a detailed circuit diagram of one example of the memory mapped register file 206 of FIG. 3. In this example, memory mapped register file 206 can operate in a multiple issue data processing system, more specifically, a dual issue data processing system. As shown, memory mapped register file 206 includes a register file memory unit 600, a plurality of source address (read) encoders $602_1$ through $602_4$, and write address encoders $610_1$ through $610_2$.

Register file memory unit 600 is a single memory unit having thirty-two registers and storage locations. The registers are associated with general purpose registers R0 through R14 and RI 5 (reserved) addressable by encoded addresses 00000 through 11111 for different processor modes in the manner illustrated in memory map 500 of FIG. 5. Memory unit 600 can be implemented as a static random access memory (SRAM) or as a plurality of flip-flops. Register file memory unit 600 is also scalable capable to be capable of having sixty-four registers using 6-bit encoded addresses.

Read encoders $602_1$ through $602_4$ receive processor_mode inputs and src1.index through src4.index inputs, respectively, and write encoders $610_1$ through $610_2$ receive processor_mode inputs and wr1.index through wr2.index inputs. Read encoders $602_1$ through $602_4$ encode a 4-bit source general purpose register index, as shown in memory map 500, to a 5-bit encoded address for accessing a specific register within register file memory unit 600 during a particular processor mode to output source data for instructions. In this example, register file memory unit 600 can output a plurality of source data (src1_data through src4_data) for two instructions.

Read encoders $602_1$ through $602_4$ can either latch the encoded addresses in associated latches $604_1$ through $604_4$, respectively, or directly output encoded addresses to associated selectors $606_1$ through $606_4$, respectively, that also receive as inputs the output of latches $604_1$ through $604_4$.

Latches $604_1$ through $604_4$ latch resultant encoded addresses for pipeline storage of the encoded address in the case that data for an instruction can be reused at the storage location of the latched encoded address. Selectors $606_1$ through $606_4$ select either the encoded address directly from the associated address encoders or from the associated latches in response to a signal (not shown) generated by in the instruction decode stage 204. In one example, if one of the selectors $606_1$ through $606_4$ selects an encoded address from the associated read address encoder, the encoded address is also latched for pipeline storage. In this manner, the 5-bit encoded address is latched for pipeline storage as opposed to the 4-bit source index, thereby providing further processing efficiency.

Likewise, write encoders $610_1$ and $610_2$ each encode a 4-bit source general purpose register index to a 5-bit encoded address for accessing a specific register to write data into register file memory unit 600. In this example, a plurality of write data (wr0_data through wr1_data) can be written into register file memory unit 600. For example, if two instructions can be retired or written back, wr0_data and wr1_data can be written in register file memory 600 at the same time. Register file memory unit 600 can be scalable to have any number of write ports to which any number of data can be applied for writing in the memory mapped register file 206. The manner of reading data from and writing data into general purpose registers of memory mapped register file 206 will now be explained with regards to FIGS. 7 and 8.

Figure 7:
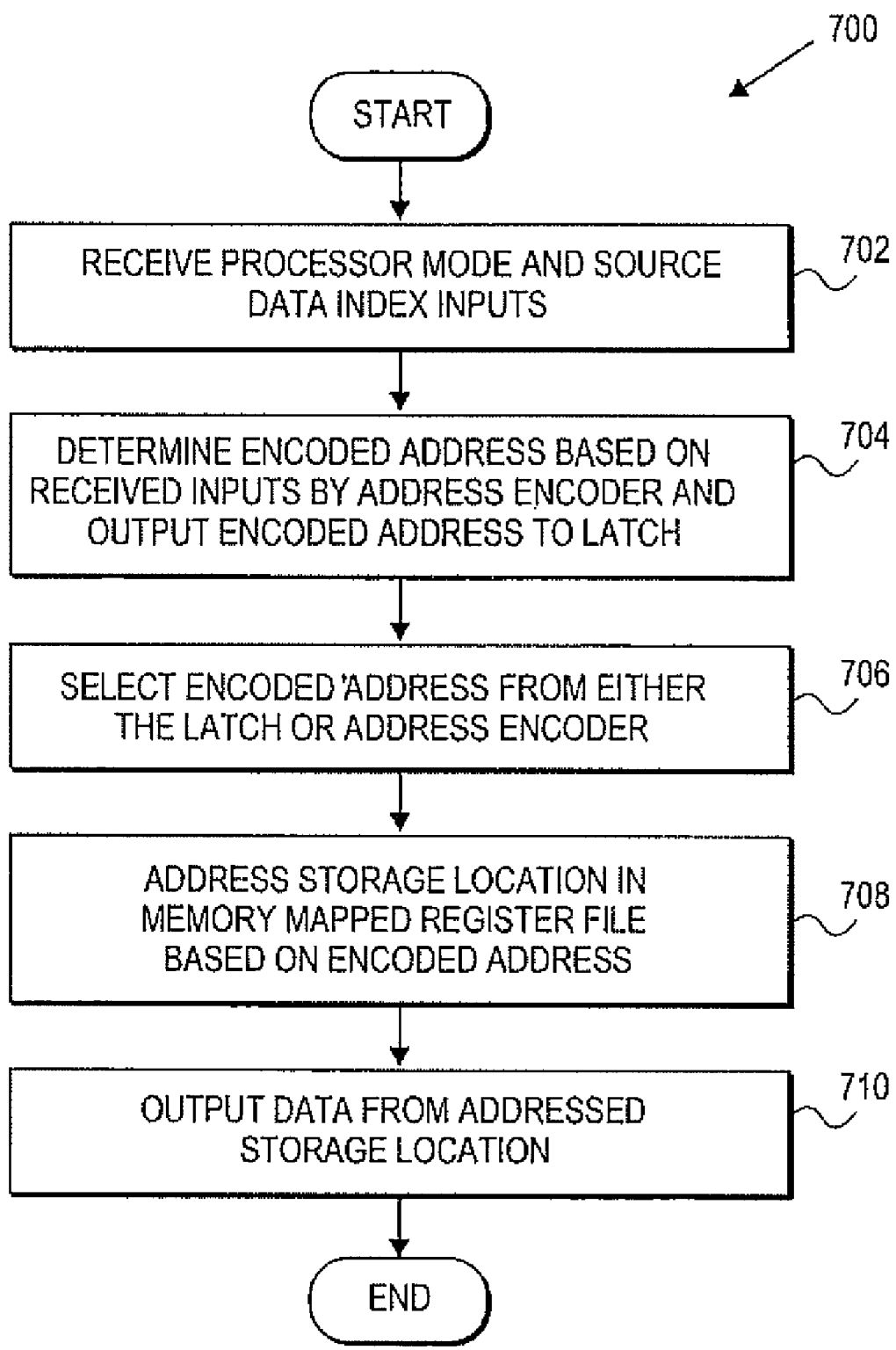
FIG. 7 illustrates one example of a flow diagram for a method to output source data from the memory mapped register file of FIG. 6.

FIG. 7 illustrates one example of a flow diagram for a method 700 to output source data from memory mapped register file 206 of FIG. 6. Initially, processor mode and source data index inputs are received (step 702). For example, if an ALU instruction is to be executed in FIQ processor mode that needs values A and B from general purpose registers R8 and R9, the processor mode input would be "FIQ" and the source data index inputs (src1.index and src2.index) would be 1000 and 1001 for registers R8 and R9.

Next, an encoded address is determined based on the received inputs by an address encoder that outputs the encoded address to a latch (step 704). Using the example of memory map 500 above, a source index 1000 maps to encoded address 01000 and source index 1001 maps to encoded address 01001. A selector selects the encoded address stored in the latch or from the address encoder directly (step 706). For instance, selectors $606_1$ and $606_2$ can select encoded addresses (01000 and 01001) from either latches $604_1$ and $604_2$, respectively, or address encoders $602_1$ and $602_2$ directly in which the encoded addresses are outputted to register file memory unit 600. The registers in register file memory unit 600 are then addressed (step 708). In particular, registers R8 and R9 can be addressed using the encoded addresses 01000 and 01001 to access data for registers R8 and R9. Finally, the data A and B at the addressed location are outputted (step 710). That is, the data A and B stored in registers R8 and R9 at encoded addresses 01000 and 01001 are outputted as src1_data and src2_data from register file memory unit 600 to execution stage 204 to execute the ALU operation.

The method shown in FIG. 7 can also be implemented for multiple instructions in which four registers are accessed, assuming there are no data dependencies. For example, if two ALU instructions are required needing values A through D stored in registers R8 through R11 for FIQ mode, the address encoders $602_1$ through $602_4$ obtain the encoded addresses 01000 through 01011 from the source indexes 1000 through 1011 for registers R8 through R11. The data values A through D at storage locations addressable by the encoded addresses are outputted as src1_data through src4_data.

Figure 8:
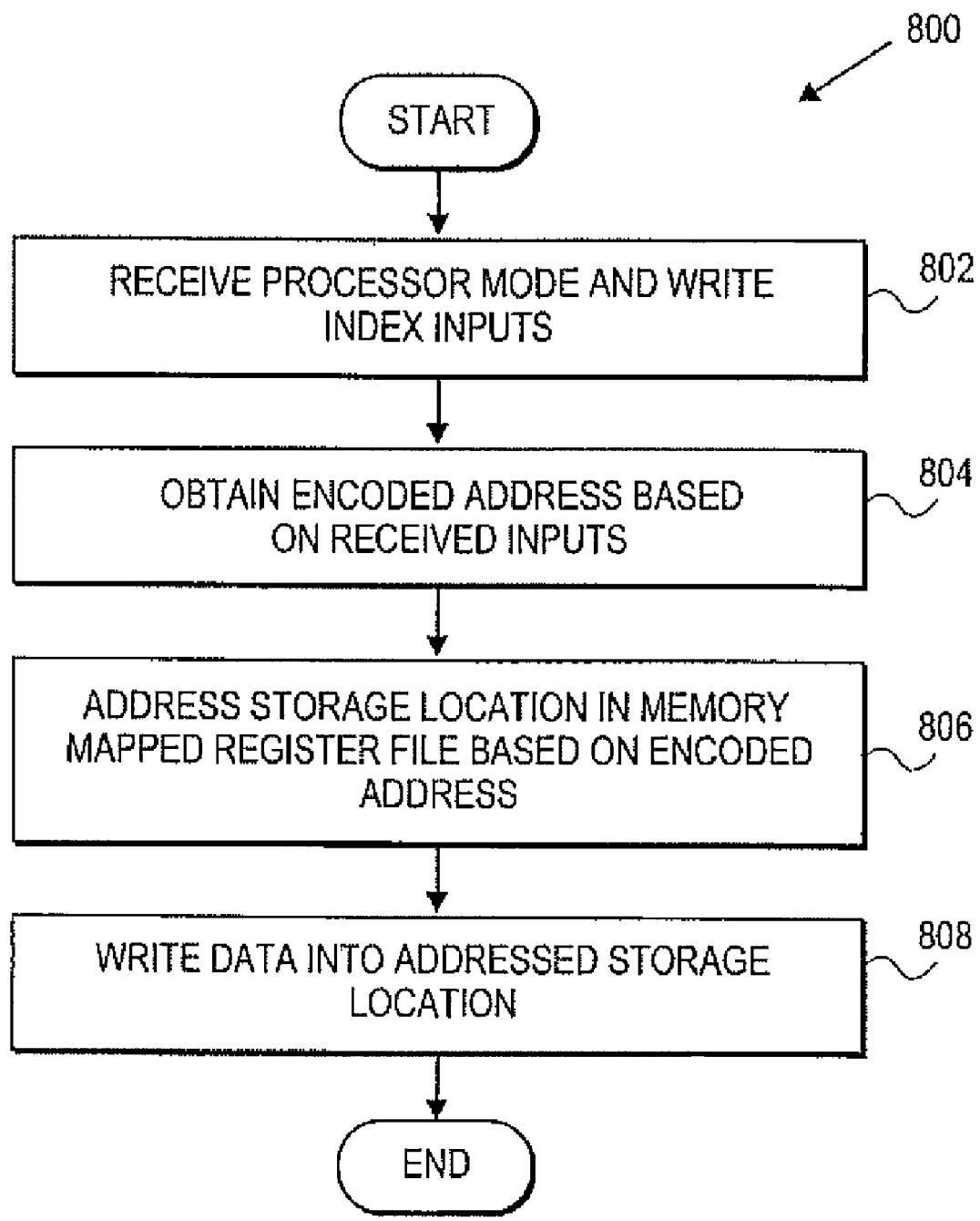
FIG. 8 illustrates one example of a flow diagram for a method to write data into the memory mapped register file of FIG. 6.

FIG. 8 illustrates one example of a flow diagram for a method 800 to write data into memory mapped register file 206 of FIG. 6. Initially, processor mode and write index inputs are received (step 802). In method 800, wr0_data and wr1_data received at write input ports are to be written into two registers (R8 and R9) of register file memory unit 600 during FIQ mode. Thus, the processor mode input would be "FIQ" and the wr0.index would be 1000 and the wr1.index would be 1001.

Next, an encoded address is obtained based on the received inputs (step 804). Using the example of memory map 500 above, wr0.index of 1000 maps to encoded address 01000 and wr1.index of 1001 maps to encoded address 01001. The storage locations in register file memory unit 600 are then addressed based on the encoded addresses (step 806). In particular, registers R8 and R9 can be addressed using the encoded addresses 01000 and 01001 for writing data to registers R8 and R9. Finally, the wr0_data and wr1_data are written into the storage locations addressable by the encoded addresses 01000 and 01001.

Thus, a memory mapped register file has been described. The memory mapped register file described herein can be implemented for general computing devices, examples of which include microprocessors, processors, central processing units (CPUs), application specific integrated circuits (ASICs), system on a chips (SOCs), embedded systems, micro-controllers, and other computing devices. Moreover, the memory mapped register file can be implemented for multi-stage and variable stage pipelining architectures that operate in different processor modes.

Furthermore, in the foregoing specification, the invention has been described with reference to specific exemplary embodiments and implementations thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A memory mapped register file, comprising:
 an address encoder configured to
  receive a source index input having a length of T−1 bits, the source index input identifying one of a plurality of unbanked registers,
  receive a processor mode input to identify one of P processor modes, where P is greater than two, and
  generate an encoded address having a length of T bits based on (i) the source index input and (ii) the processor mode input;
 memory including the plurality of unbanked registers, wherein the encoded address identifies one of the plurality of unbanked registers associated with one of the P processor modes;
 a second address encoder configured to
  receive a write index input having a length of T−1 bits, the write index input identifying one of the plurality of unbanked registers,
  receive the processor mode input, and
  generate a second encoded address having a length of T bits based on (i) the write index input and (ii) the processor mode input; and
 a write data input,
 wherein the memory is configured to input data from the write data input to one of the plurality of unbanked registers identified by the second encoded address.

2. The memory mapped register file of claim 1, wherein T is 5.

3. The memory mapped register file of claim 1, wherein the memory includes $2^{T-1}$ unbanked registers, where T is greater than two.

4. The memory mapped register file of claim 1, further comprising:
   a latch configured to latch the encoded address from the address encoder; and
   a selector configured to select the encoded address from the latch or the address encoder.

5. The memory mapped register file of claim 1, further comprising a source data output,
   wherein the memory is configured to output data addressed from the one of the plurality of unbanked registers identified by the encoded address to the source data output.

6. The memory mapped register file of claim 1, wherein the processor mode includes exception handling modes.

7. The memory mapped register file of claim 6, wherein the exception handling modes include one or more of: a fast interrupt request (FIQ) mode, interrupt request (IRQ) mode, supervisor (SVC) mode, undefined instruction (UND), and abort exception (ABT) mode.

8. The memory mapped register file of claim 7, wherein each of the exception handling modes corresponds to at least one of the plurality of unbanked registers.

9. A microprocessor comprising the memory mapped register file of claim 1.

10. A method for operating a memory mapped register file, the method comprising:
    receiving a source index input having a length of T−1 bits, the source index input identifying one of a plurality of unbanked registers;
    receiving a processor mode input to identify one of P processor modes, where P is greater than two;
    generating an encoded address having a length of T bits based on the source index input and the processor mode input;
    identifying one of the plurality of unbanked registers associated with one of the P processor modes using the encoded address;
    receiving a write index input having a length of T−1 bits, the write index input identifying one of the plurality of unbanked registers;
    generating a second encoded address having a length of T bits based on the write index input and the processor mode input; and
    inputting data to one of the plurality of unbanked registers identified by the second encoded address.

11. The method of claim 10, wherein T is 5.

12. The method of claim 10, wherein the memory includes $2^{T-1}$ unbanked registers, where T is greater than two.

13. The method of claim 10, further comprising outputting data addressed from the one of the plurality of unbanked registers identified by the encoded address.

14. The method of claim 10, wherein the processor mode includes exception handling modes.

15. The method of claim 14, wherein the exception handling modes include one or more of: a fast interrupt request (FIQ) mode, interrupt request (IRQ) mode, supervisor (SVC) mode, undefined instruction (UND), and abort exception (ABT) mode.

16. The method of claim 15, wherein each of the exception handling modes corresponds to at least one of the plurality of unbanked registers.

* * * * *